(12) United States Patent
Nohara et al.

(10) Patent No.: US 11,084,320 B2
(45) Date of Patent: Aug. 10, 2021

(54) COATING METHOD AND COATING FILM

(71) Applicant: MITSUBISHI HEAVY INDUSTRIES, LTD., Tokyo (JP)

(72) Inventors: Toshikatsu Nohara, Tokyo (JP); Masaki Kimura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/348,569

(22) PCT Filed: Oct. 18, 2017

(86) PCT No.: PCT/JP2017/037682
§ 371 (c)(1),
(2) Date: May 9, 2019

(87) PCT Pub. No.: WO2018/092497
PCT Pub. Date: May 24, 2018

(65) Prior Publication Data
US 2019/0329587 A1 Oct. 31, 2019

(30) Foreign Application Priority Data
Nov. 16, 2016 (JP) .............................. JP2016-223225

(51) Int. Cl.
*B44C 1/17* (2006.01)
(52) U.S. Cl.
CPC .................................. *B44C 1/1733* (2013.01)
(58) Field of Classification Search
CPC ... B44F 1/10; B32B 17/10247; B44C 1/1733; B44C 1/1737; B44C 1/1741; B44C 1/1745; B44C 1/10; B44C 1/105
See application file for complete search history.

(56) References Cited

U.S. PATENT DOCUMENTS 4,973,509 A 11/1990 Yamane
5,556,693 A 9/1996 Yamane et al.
(Continued)

FOREIGN PATENT DOCUMENTS

JP    S52-048937 B2    12/1977
JP    S57-100093 A     6/1982
(Continued)

OTHER PUBLICATIONS

International Search Report issued in corresponding International Patent Application No. PCT/JP2017/037682, dated Dec. 5, 2017 (4 pages).
(Continued)

*Primary Examiner* — Michael P Wieczorek
(74) *Attorney, Agent, or Firm* — Osha Bergman Watanabe & Burton LLP

(57) ABSTRACT

A coating method includes: forming multiple through holes in a coating film including a support sheet and a transfer layer on the support sheet, the multiple through holes passing through only the transfer layer; after the forming of the multiple through holes, disposing the coating film so that the transfer layer faces a surface of a target object; pressing the coating film against the surface of the target object from a side of the support sheet so that the transfer layer is transferred to the surface of the target object; and, after the pressing, peeling off the support sheet from the transfer layer.

4 Claims, 5 Drawing Sheets

(56) References Cited

U.S. PATENT DOCUMENTS

| | | | | | |
|---|---|---|---|---|---|
| 5,609,938 | A | * | 3/1997 | Shields | B44C 1/1733 |
| | | | | | 359/594 |
| 5,830,529 | A | * | 11/1998 | Ross | B41M 3/12 |
| | | | | | 427/152 |
| 6,824,639 | B1 | * | 11/2004 | Hill | B44C 1/1716 |
| | | | | | 156/230 |
| 2017/0157910 | A1 | | 6/2017 | Sumikawa et al. | |

FOREIGN PATENT DOCUMENTS

| | | |
|---|---|---|
| JP | H02-081687 A | 3/1990 |
| JP | H03-069397 A | 3/1991 |
| JP | H03-090998 U | 9/1991 |
| JP | H03-236985 A | 10/1991 |
| JP | H04-247912 A | 9/1992 |
| JP | 2003-305997 A | 10/2003 |
| JP | 2017-105035 A | 6/2017 |
| JP | 2017-105036 A | 6/2017 |

OTHER PUBLICATIONS

Written Opinion issued in corresponding International Patent Application No. PCT/JP2017/037682, dated Dec. 5, 2017 (11 pages).

* cited by examiner

COATING METHOD AND COATING FILM

TECHNICAL FIELD

The present invention relates to a coating method and a coating film.

BACKGROUND ART

A technique for transferring a design by using a coating film is known as a method of decorating the body surface of aircrafts and the like.

A coating film has a support sheet and a transfer layer provided thereon. The transfer layer is composed of coating material and has the shape of a desired design. The transfer layer is transferred to the body surface by pressing the transfer layer of the coating film against the body surface.

CITATION LIST

Patent Literature

[PTL 1]
Japanese Unexamined Patent Application, Publication No. H04-247912

SUMMARY OF INVENTION

Technical Problem

In general, a coating film is pressed from the support sheet side by using a pressing means such as a roller or a squeegee to transfer the transfer layer to the body surface. During the transfer, air bubbles may be trapped between the coating film and the body surface.

If air bubbles are trapped, the adhesion between the transfer layer and the body surface drops. If air bubbles remain between the transfer layer and the body surface, defects such as deterioration in the appearance quality of the decoration (design) or breakage due to changes in atmospheric pressure may occur.

PTL 1 discloses a method of removing air bubbles from an SMC sheet consisting of a double film. In PTL 1, the double film with the upper film provided with air holes is passed through multiple upper and lower rollers so that the air bubbles are removed. The method described in PTL 1, which involves processing through rollers, cannot be applied to the removal of air bubbles trapped between the body surface and the transfer layer.

An object of the present invention, which has been made in view of such circumstances, is to provide a coating method and a coating film that prevent air bubbles from remaining between the body surface and the transfer layer.

Solution to Problem

The present invention provides a coating method including: forming multiple through holes in a coating film including a support sheet and a transfer layer on the support sheet, the multiple through holes passing through only the transfer layer; after the forming the through holes, disposing the coating film so that the transfer layer faces the surface of a target object; pressing the coating film against the surface of the target object from a side of the support sheet so that the transfer layer is transferred to the surface of the target object; and after the pressing, peeling off the support sheet from the transfer layer.

The multiple through holes act as air bubble removing holes allowing air bubbles trapped between the surface of the target object and the transfer layer to be led between the transfer layer and the support sheet. The air bubbles led between the transfer layer and the support sheet, integrate with the atmosphere when the support sheet is peeled off. As a result, damage due to a decrease in adhesion between the surface of the target object and the transfer layer, a decrease in appearance quality, a decrease in atmospheric pressure, and the like can be avoided.

In one aspect of the invention, in the forming the multiple through holes, an up-down direction on a surface of the transfer layer is preferably determined, and the multiple through holes are preferably formed so that the multiple through holes are arranged at intervals along the up-down direction to form multiple columns, and the through holes in any column are shifted in the up-down direction with respect to the through holes in an adjacent column.

Since the positions of the through holes in the adjacent column are shifted in the up-down direction, the presence of the through holes in the transfer layer can be made visually inconspicuous. This may improve the appearance quality.

The present invention provides a coating film including: a support sheet; and a transfer layer peelably supported by the support sheet, wherein the transfer layer includes multiple through holes, and the multiple through holes are arranged so that the through holes are arranged at intervals along a predetermined up-down direction to form multiple columns, and the through holes in any column are shifted in the up-down direction with respect to the through holes in an adjacent column.

Advantageous Effects of Invention

According to the present invention, after multiple through holes are formed in the transfer layer, the coating film is pressed against the surface of the target object, so that the transfer layer can be transferred to the surface of the target object in such a manner that air bubbles do not remain.

DESCRIPTION OF EMBODIMENTS

Figure 1:
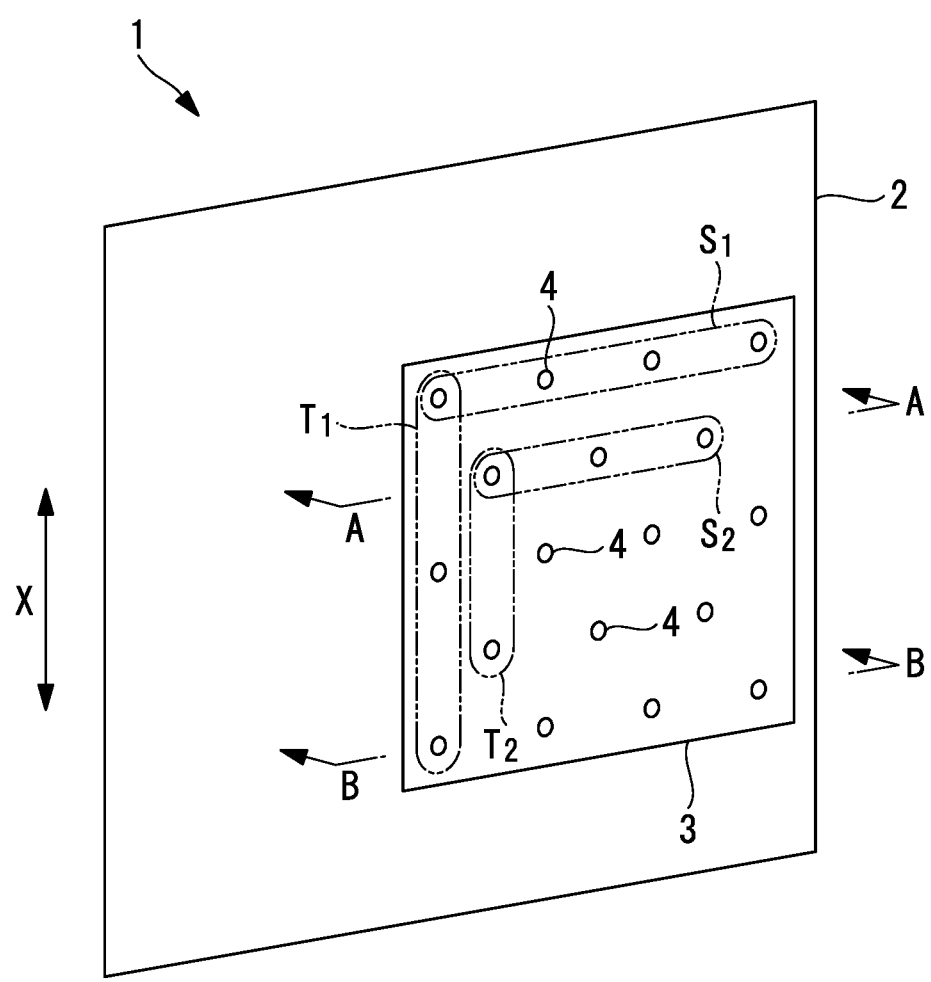
FIG. 1 is an exploded perspective view of a coating film according to one embodiment of the present invention.
Figure 2:
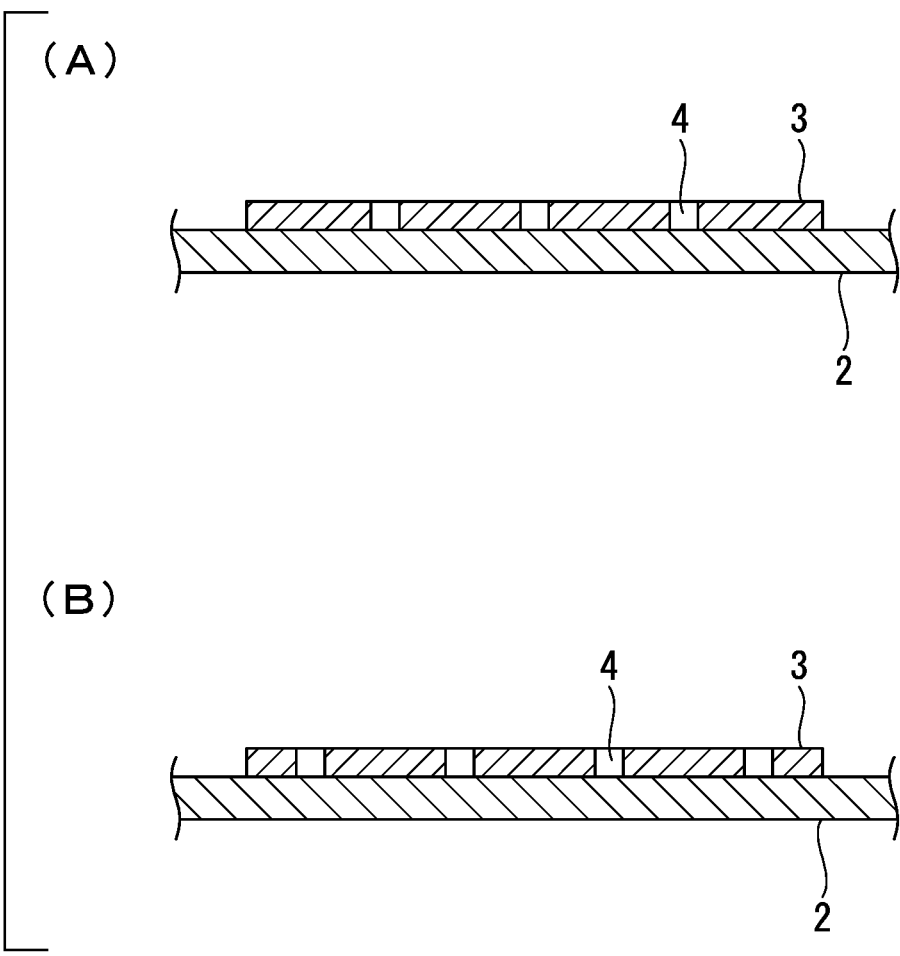
FIG. 2 is a cross-sectional view of a coating film according to one embodiment of the present invention.

One embodiment of coating method and coating film according to the present invention will now be described with reference to the accompanying drawings. FIG. 1 is an exploded perspective view of a coating film according to this embodiment. FIG. 2(A) is a cross-sectional view along line A-A of the coating film shown in FIG. 1, and FIG. 2(B) is a cross-sectional view along line B-B of the coating film shown in FIG. 1.

A coating film 1 includes a support sheet 2 and a transfer layer 3 supported on the support sheet 2.

The support sheet 2 supports the transfer layer 3. The support sheet 2 has liquid-tightness that does not allow the transfer layer 3 to permeate. The support sheet 2 has peelability from the transfer layer 3. The support sheet 2 has a smooth surface. The "smooth surface" can impart a desired smoothness to the contacting transfer layer surface. The support sheet 2 is composed of, for example, polyester, polyolefin, or release-treated paper. The support sheet 2 has no adhesion to the surface of the target object.

The transfer layer 3 has a desired design and is transferred to decorate the surface of the target object. The transfer layer 3 is mainly composed of a coating material. The coating material is composed of a material suitable for the object. For example, if the object is the body of an aircraft, a coating material marketed for aircrafts can be used. Coating materials for aircrafts have the flexibility to deal with changes in external atmospheric pressure. The coating material may contain elements (inks, additives, and the like) needed to form a design pattern. In the state before transfer, the transfer layer 3 is in close contact with the support sheet so that it is supported by the support sheet 2 even when flipped over.

The transfer layer 3 includes multiple through holes 4. The multiple through holes 4 are arranged at intervals along a predetermined up-down direction X to form multiple columns $T_1, T_2, \ldots T_n$ (n is an arbitrary natural number). The multiple through holes 4 are arranged at intervals along the left-right direction to form multiple rows $S_1, S_2, \ldots S_m$ (m is an arbitrary natural number).

The "up-down direction" is a direction determined as appropriate in accordance with the design of the transfer layer 3 and the application of the object. In the transfer layer (decorative layer) 5 transferred to the surface of the object, the main direction of the view by the viewer (main view direction) exists. Here, "up-down" refers to the upper side and the lower side in the front view of the design when viewed from the main view direction. The "left-right direction" is the direction orthogonal to the up-down direction.

On the surface of the transfer layer 3, a virtual line P connecting the adjacent through holes 4 is a mesh. The shape of the mesh is preferably square. A mesh 6 preferably has an angle Q with respect to the up-down or left-right direction. For example, the angle Q of the mesh 6 is ±15 degrees or more and ±75 degrees or less, preferably ±45 degrees with respect to the up-down direction.

The diameter of the through holes 4 is 1.0 mm or less, preferably 0.3 mm or more and 0.7 mm or less. An interval R (distance between hole centers) of the adjacent through holes 4 is 5.0 mm or more and 30 mm or less, for example, 10 mm. The thickness of the transfer layer 3 is 25 μm or more and 100 μm or less.

Figure 3:
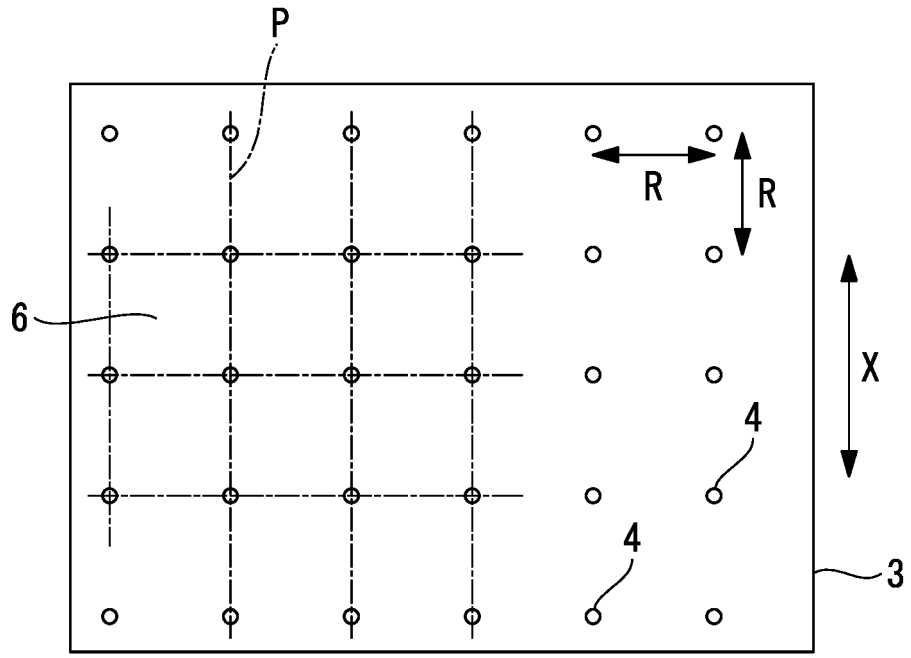
FIG. 3 is a front view of a transfer layer illustrating the arrangement of through holes.
Figure 4:
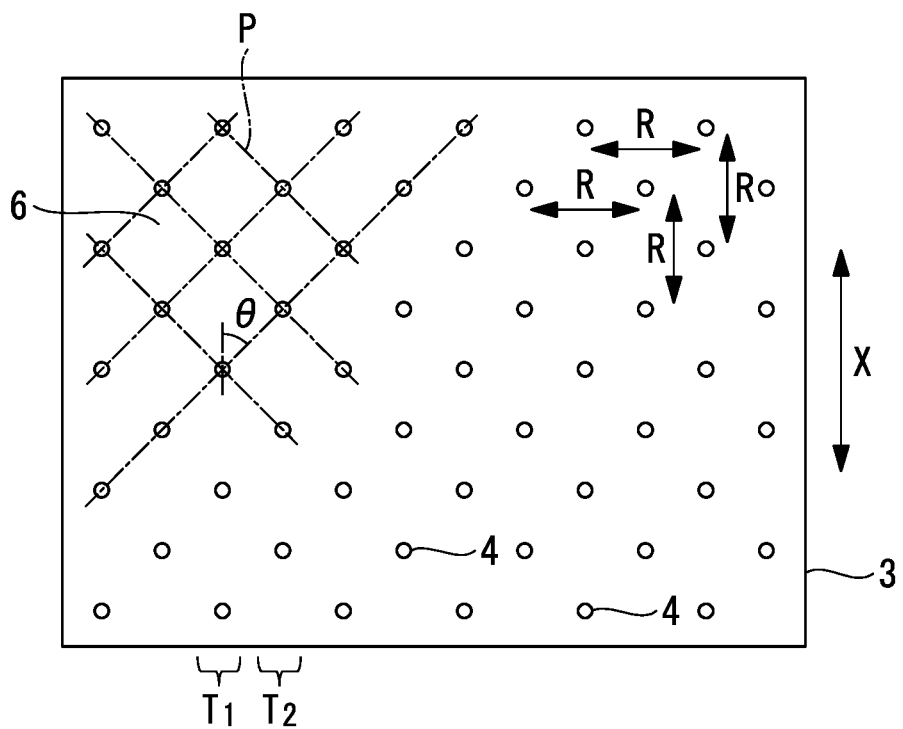
FIG. 4 is a front view of a transfer layer illustrating another arrangement of through holes.

The arrangement of the through holes 4 is illustrated in FIGS. 3 and 4. The up-down direction X in FIGS. 3 and 4 is directed to the up-down sides in the drawing. In FIG. 3, multiple through holes 4 are arranged at equal intervals in two directions (up-down and right-left) on the surface of the transfer layer 3 to form multiple columns and rows.

In FIG. 4, the through holes 4 in any column $T_1$ are arranged so that they are shifted in the up-down direction with respect to the through holes 4 in the adjacent column $T_2$. The multiple through holes 4 are arranged in a staggered manner. The mesh 6 has a square shape, and is inclined an angle of ±45 degrees with respect to the up-down direction X.

Figure 5:
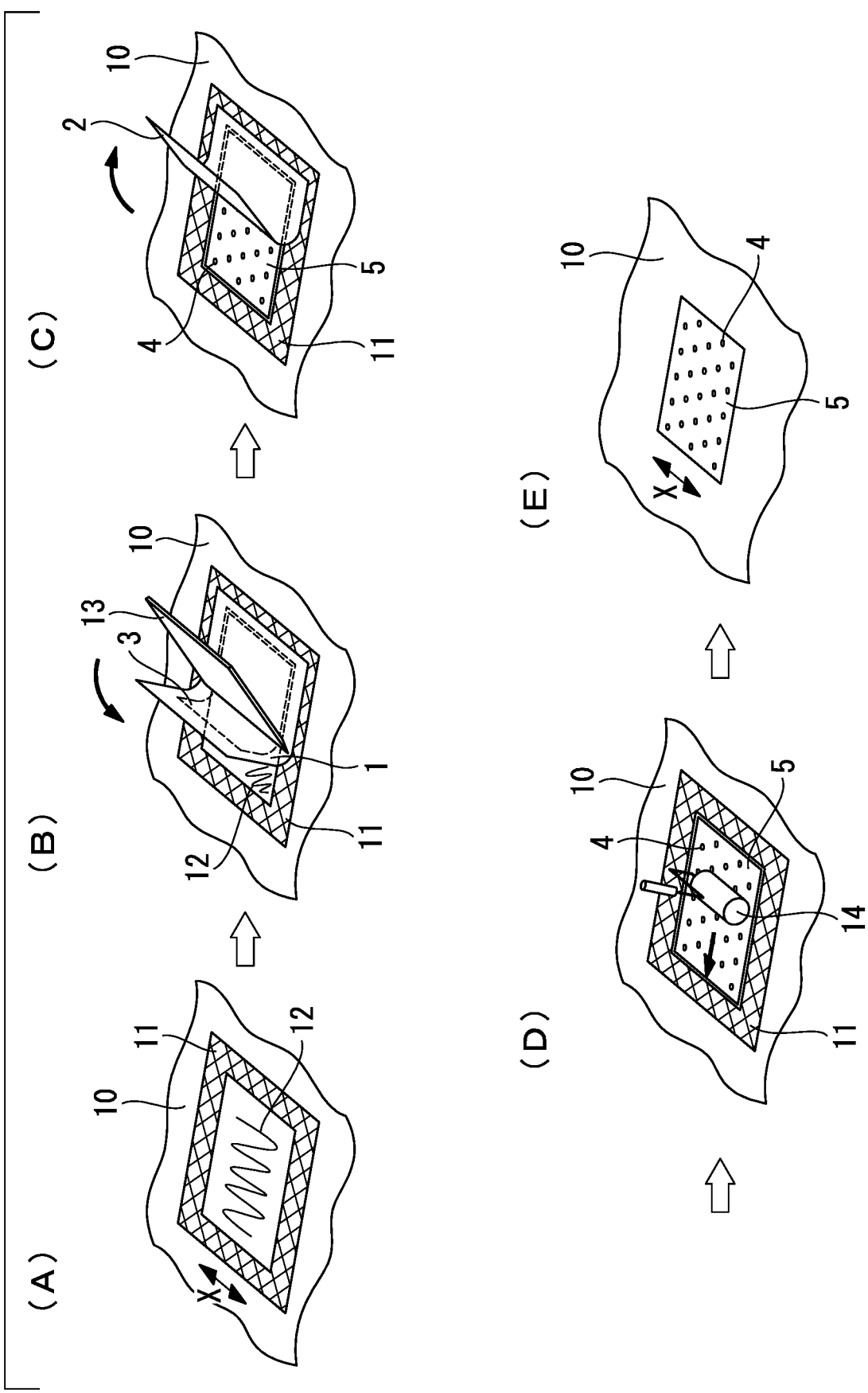
FIG. 5 is a flowchart for explaining the procedure of a coating method according to the embodiment.

Next, the procedure of a coating method according to this embodiment will be explained with reference to FIG. 5. The coating method according to this embodiment can be applied to coating of aircrafts, ships, railroad cars, and the like. In this embodiment, the case where the body surface 10 of an aircraft is the object will be described.

(Coating Film)

A coating material is printed on the support sheet 2 to form the transfer layer 3. A well-known technique can be used as the print method. After printing, the solvent of the coating material is volatilized as appropriate to provide a viscosity that prevents the through holes 4 from being closed. A commercially available product can also be used because the transfer layer 3 of a commercially available coating film has a viscosity that prevents the through holes 4 from being closed.

Next, multiple through holes 4 are formed in the transfer layer 3. To form the through holes 4, the up-down direction X on the surface of the transfer layer 3 is determined in advance. The multiple through holes 4 are arranged at intervals along the predetermined up-down direction X to form multiple columns. The multiple through holes 4 are arranged, for example, as shown in FIGS. 3 and 4. As shown in FIG. 4, the multiple through holes 4 may be formed so that the through holes 4 in any column are shifted in the up-down direction X with respect to the through holes 4 in the adjacent column.

The through holes 4 are formed using a boring member (not shown in the drawings) so that they pass through only the transfer layer 3 without passing through the support sheet 2. The boring member is, for example, an engraving machine, a cutting plotter, or a laser processing machine. The engraving machine can form the through holes 4 only in the transfer layer 3 without allowing them to pass through the support sheet 2 when the travel distance along the Y axis of the spindle is set to the thickness of the transfer layer 3. Since they are not allowed to pass through the support sheet 2, the coating material of the transfer layer 3 can be prevented from exuding from the support sheet due to the pressure during transfer.

(Pretreatment)

Before coating, the body surface 10 is brought into a clean and dry state as needed. For example, isopropyl alcohol is used to clean the body surface 10. If necessary, surface treatment such as sanding may be performed before cleaning.

(Masking)

The coating area on the body surface is surrounded by a masking material 11 (see FIG. 5(A)).

(Application of Adhesive Coating Material)

An adhesive coating material is applied to the coating area of the body surface 10 to form an adhesive coat 12 (see FIG. 5(A)). The adhesive coat 12 has tackiness but does not adhere to an object such as a finger. The adhesive coating material is, for example, a polyurethane coating material or a lacquer coating material.

(Transfer)

The coating film 1 having the transfer layer 3 in which the through holes 4 are formed is disposed so that the transfer layer 3 faces the body surface 10. At this time, the up-down direction X of the transfer layer 3 is aligned with the upper side and the lower side in the front view of the application area of the body surface 10 when viewed from the main view direction.

Next, the coating film 1 is pressed from the support sheet 2 side to the body surface 10 to transfer the transfer layer 3 to the body surface 10. In FIG. 5(B), the transfer layer 3 is positioned so as to be within the area surrounded by the masking material 11, and one end of the coating film 1 is fixed to the body surface 10. A pressing member 13 is pressed onto the support sheet 2 at the fixed one end, and is slid toward the other end. Consequently, the transfer layer 3 is transferred to the body surface 10 and becomes the decorative layer 5. If the transfer layer 3 is not transferred to the body surface with one slide, pressing is repeated. The pressing member 13 is a squeegee, a roller, or the like.
(Aftertreatment)

After the confirmation of the fact that the transfer layer 3 has been transferred to the body surface 10, the support sheet 2 is peeled off from the decorative layer 5 (see FIG. 5(C)). Next, a protective coating material is applied to the surface of the transferred transfer layer (decorative layer) 5 by using an application member 14 such as a roller (see FIG. 5(D)). The protective coating material is composed of a material that can impart durability and high appearance quality to the decorative layer 5. The protective coating material is, for example, a polyurethane coating material or a lacquer coating material.

The applied protective coating material is dried to form a protective film (not shown in the drawings), and the masking material 11 is then removed (see FIG. 5(E)).

Figure 6:
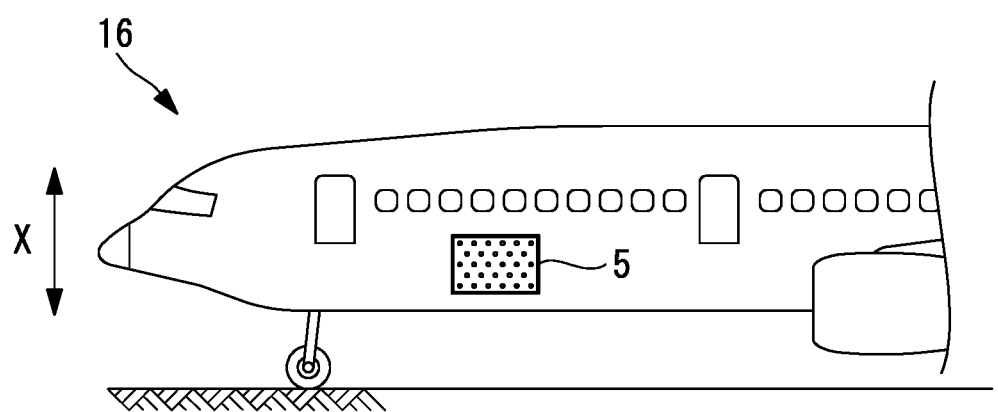
FIG. 6 is a diagram showing the appearance of a transfer layer transferred to the body surface of an aircraft.

FIG. 6 shows the appearance of the transfer layer (decorative layer) 5 transferred to the surface on the aircraft 16's body side. In FIG. 6, the main view direction is the direction horizontal to the ground (the depth direction in the drawing), and the up-down direction X is the direction along the gravity direction. In FIG. 6, through holes 4 are arranged so that the multiple through holes 4 are arranged at intervals along the predetermined up-down direction X to form multiple columns, and the through holes 4 in any column are shifted in the up-down direction X with respect to the through holes 4 in the adjacent column.

In this embodiment, the coating film 1 is pressed to transfer the transfer layer 3. At this time, the air bubbles trapped between the transfer layer 3 and the body surface 10 move to the back side (the support sheet 2 side) of the transfer layer 3 through the through holes 4. The air bubbles moved to the back side are diffused into the atmosphere when the support sheet 2 is peeled off. Consequently, air bubbles can be prevented from remaining between the transfer layer 3 and the body surface 10, and adhesion between the transfer layer 3 and the body surface 10 can be improved.

In FIGS. 1 to 6, in order to clarify the arrangement of the through holes 4, the through holes 4 are shown with a size different from the actual one. The through holes 4 having a diameter of 0.3 mm or more and 0.7 mm or less cannot be visually recognized from a long distance. The presence of the through holes 4 can probably be recognized at a distance of about 3 m, but its presence can be made more unrecognizable by shifting the through holes in the adjacent column in the up-down direction as shown in FIG. 4. This can improve the appearance quality. The same effect can be obtained even if the body surface 10 to which the transfer layer 3 is transferred is a curved surface.

REFERENCE SIGNS LIST 1 coating film
2 support sheet
3 transfer layer
4 through hole
5 decorative layer (transfer layer)
6 mesh
10 body surface (surface of the target object)
11 masking material
12 adhesive coat
13 pressing member
14 application member
16 aircraft

The invention claimed is:

1. A coating method for coating a body of an aircraft as a target object, the method comprising:
forming multiple through holes in a coating film including a support sheet and a transfer layer that is composed of a coating material for the aircraft and that is disposed on the support sheet, the multiple through holes passing through only the transfer layer;
performing sanding treatment on a surface of the target object, and forming an adhesive coat on the surface of the target object by applying a polyurethane coating material or a lacquer coating material to the surface of the target object,
disposing, on the surface of the target object on which the adhesive coat is formed, the coating film with the multiple through holes such that the transfer layer faces the surface of the target object;
pressing the coating film against the surface of the target object from a side of the support sheet such that the transfer layer is transferred to the surface of the target object; and
after the pressing, peeling off the support sheet from the transfer layer, wherein
the forming of the multiple through holes comprises
determining an up-down direction on a surface of the transfer layer,
the multiple through holes are arranged at intervals along the up-down direction to form multiple columns such the through holes in any column are shifted in the up-down direction with respect to the through holes in an adjacent column,
a diameter of the through holes is 0.3 mm or more and 0.7 mm or less, and
a distance between hole centers of the through holes adjacent to each other is 5.0 mm or more and 30 mm or less.

2. The coating method according to claim 1, wherein a thickness of the transfer layer is 25 μm or more and 100 μm or less.

3. An aircraft body coated using the coating method according to claim 1.

4. The aircraft body according to claim 3, wherein a thickness of the transfer layer is 25 μm or more and 100 μm or less.

* * * * *